(12) United States Patent
Fujimoto et al.

(10) Patent No.: US 7,673,729 B2
(45) Date of Patent: Mar. 9, 2010

(54) LAYOUT STRUCTURE OF CLUTCH LEVER SHAFT

(75) Inventors: Yasushi Fujimoto, Saitama (JP); Katsuhiko Ito, Saitama (JP); Masazumi Naito, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 712 days.

(21) Appl. No.: 11/496,618

(22) Filed: Aug. 1, 2006

(65) Prior Publication Data

US 2007/0029154 A1 Feb. 8, 2007

(30) Foreign Application Priority Data

Aug. 4, 2005 (JP) .............................. 2005-226325

(51) Int. Cl.
  F16D 13/52 (2006.01)
  F16D 23/12 (2006.01)
  B60K 17/02 (2006.01)
(52) U.S. Cl. ...................... 192/48.3; 180/292; 192/48.8
(58) Field of Classification Search ............... 192/89.21, 192/89.26; 180/376
  See application file for complete search history.

(56) References Cited

U.S. PATENT DOCUMENTS 4,613,026 A * 9/1986 Ohzono et al. ........... 192/89.21
4,667,796 A * 5/1987 Uchibaba ................ 192/85 AA
5,501,292 A * 3/1996 Kawashima et al. ......... 180/220
5,515,940 A * 5/1996 Shichinohe et al. ......... 180/376
6,227,342 B1 * 5/2001 Armbruster et al. ....... 192/85 R
2005/0011719 A1 * 1/2005 Oishi et al. ................ 192/99 S

FOREIGN PATENT DOCUMENTS

JP 59-114130 A 7/1984

* cited by examiner

Primary Examiner—Rodney H Bonck
(74) Attorney, Agent, or Firm—Birch, Stewart, Kolasch & Birch, LLP

(57) ABSTRACT

To provide a layout structure of a clutch lever shaft capable of realizing compact layouts of a whole power unit in which a starter centrifugal clutch and a transmission manual multi-plate clutch are provided, and of a whole vehicle on which the power unit is mounted. A centrifugal clutch shaft and a manual multi-plate clutch shaft are disposed in parallel. The clutch lever shaft of the manual multi-plate clutch is disposed orthogonally and substantially vertically upward in relation to a pressing direction of a friction plate in a vicinity of an end portion of a lifter pin. The clutch lever shaft is disposed between the centrifugal clutch and the manual multi-plate clutch when viewed from a top of the power unit.

20 Claims, 3 Drawing Sheets

LAYOUT STRUCTURE OF CLUTCH LEVER SHAFT

CROSS-REFERENCE TO RELATED APPLICATIONS

The present application claims priority under 35 USC 119 to Japanese Patent Application No. 2005-226325 filed on Aug. 4, 2005 the entire contents of which are hereby incorporated by reference.

FIELD OF THE INVENTION

The present invention relates to a layout structure of a clutch lever shaft, which is caused to be rotationally moved for engaging and disengaging a transmission multi-plate clutch.

DESCRIPTION OF BACKGROUND ART

In a power unit in which a starter centrifugal clutch and a transmission manual multi-plate clutch are disposed in parallel and closely to one another, a clutch lever shaft of the transmission multi-plate clutch is conventionally disposed in a position distant from the clutches. See, for example, Japanese Patent Laid-open Publication No. Sho 59-114130. In this layout, a clutch cable extends out of the left and right sides of the power unit when viewed from the top thereof, and comes close to the body frame of a vehicle and outer parts. Therefore, the layout of the power unit becomes large and complicated.

In Japanese Patent Laid-open Publication No. Sho 59-114130, a cam 20 corresponds to the clutch lever shaft in the above description.

SUMMARY AND OBJECTS OF THE INVENTION

It is an object of the present invention to provide a layout structure of a clutch lever shaft, in the power unit provided with a starter centrifuge clutch and a transmission manual multi-plate clutch, capable of realizing compact layouts of a whole power unit and of a whole vehicle on which the power unit is mounted.

The present invention has been made to solve the above problem. According to an embodiment of the present invention, a layout structure of a clutch lever shaft of a power unit is provided wherein a crankshaft and a transmission shaft are disposed in parallel with an anteroposterior direction of a vehicle. In addition, a starter centrifugal clutch and a transmission manual multi-plate clutch are provided. The layout structure of the clutch lever shaft includes disposing the centrifugal clutch and the manual multi-plate clutch, respectively, in front portions of the crankshaft and the transmission main shaft and disposing the clutch lever shaft of the manual multi-plate clutch in a vicinity of an end portion of a lifter pin of the clutch, orthogonally and substantially vertically upwardly in relation to a direction in which a friction plate is pressed. In addition, the clutch lever shaft is disposed between the centrifugal clutch and the manual multi-plate clutch when viewed from the top of the power unit.

In the layout structure of the clutch lever shaft according to an embodiment of the present invention, a clutch cable, an end of which is connected with the clutch lever shaft of the manual clutch, and the other end of which is connected with a clutch operating lever provided on a handlebar of the vehicle, is disposed over a clutch cover covering the both clutches.

According to an embodiment of the present invention, the clutch and the clutch lever shaft are closely disposed. Therefore, the layout of a whole power unit becomes compact.

According to an embodiment of the present invention, the clutch cable does not affect the width of the vehicle because the clutch cable does not extend out of the left or right sides of the power unit. Therefore, the layout of a whole vehicle, on which the power unit is mounted, becomes compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
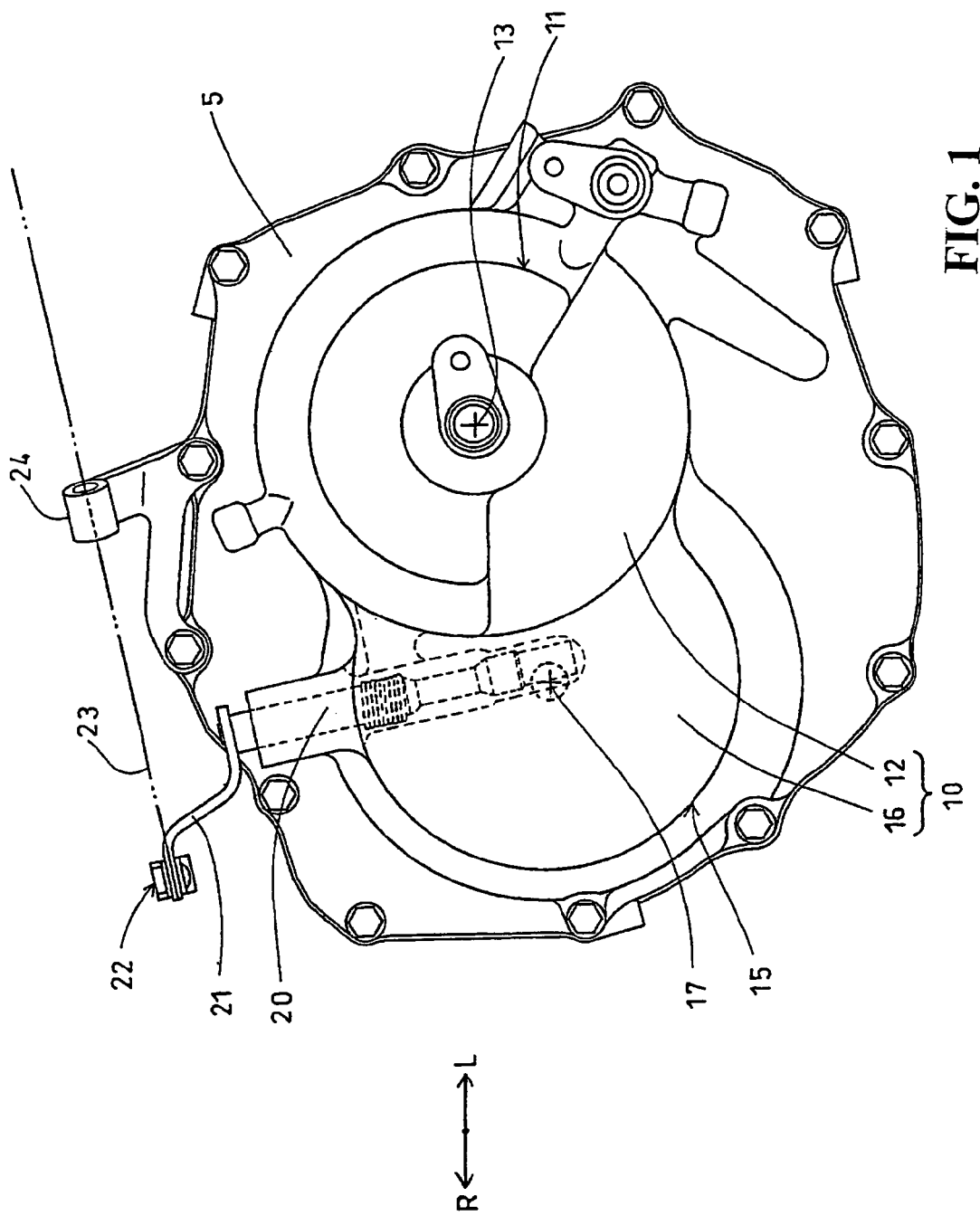
FIG. 1 is a partial front view of a power unit of a rough terrain vehicle according to one embodiment of the present invention.

FIG. 1 is a partial front view of a power unit of a rough terrain vehicle according to an embodiment of the present invention. Arrow L indicates the left and arrow R indicates the right of the vehicle. A clutch cover 10 mounted on a front crank case 5 is shown in FIG. 1. The right half of FIG. 1 is a centrifugal clutch cover 12 and the left half is a multi-plate clutch cover 16. Both of the centrifugal clutch cover 12 and the multi-plate clutch cover 16 form a part of the clutch cover 10 with the covers being connected with one another as one. A centrifugal clutch 11 is provided in the centrifugal clutch cover 12, and a multi-plate clutch 15 is provided in the multi-plate clutch cover 16. In the above-described power unit, a crankshaft and a transmission shaft are disposed in parallel with an anteroposterior line of the vehicle with the centrifugal clutch 11 being provided at an anterior end of the crankshaft. In addition, the multi-plate clutch 15 is provided at an anterior end of the main shaft of the transmission.

In FIG. 1, the position of a centrifugal clutch center 13 and a multi-plate clutch center 17 are shown in center portions of the respective covers. The centrifugal clutch center 13 is identical to the center of the axle of the crankshaft, and the multi-plate clutch center 17 is identical to the center of the axle of the main shaft of the transmission. A clutch lever shaft 20 extends obliquely upwardly from a vicinity of the multi-plate clutch center 17 with a clutch lever 21 being mounted on a top end portion thereof. Further, a clutch cable 23 is secured to a cable securing portion 22 at the tip end of the clutch lever and extends to the left of the vehicle, passing through a cylindrical portion of a cable guiding member 24.

Figure 2:
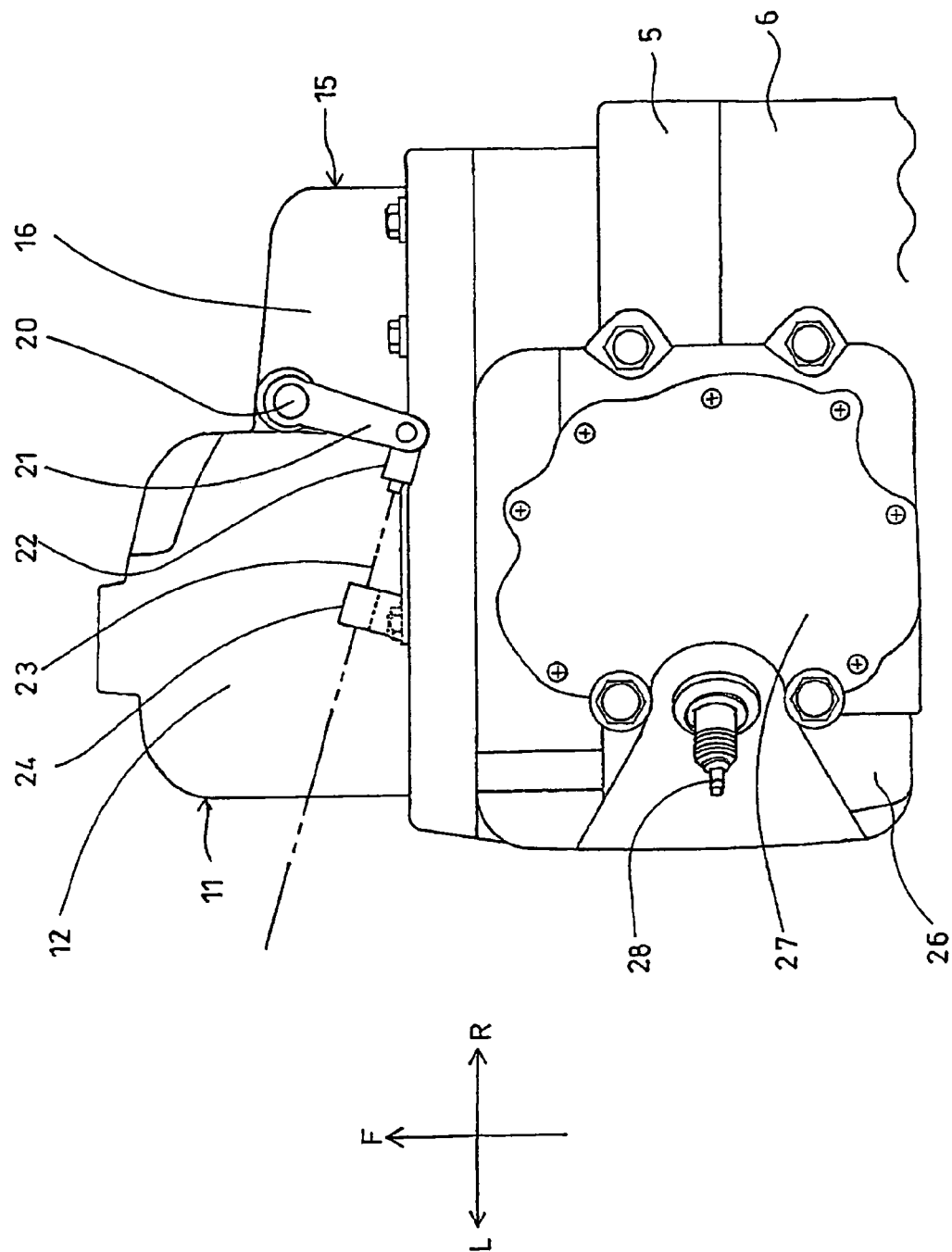
FIG. 2 is a top view of the above-described clutch portion and a cylinder portion contiguous therewith.

FIG. 2 is a top view of the above-described clutch portion and a cylinder portion contiguous therewith. Arrow F indicates the front of the vehicle. The clutch lever shaft 20 is provided substantially vertically between the centrifugal clutch 11 and the multi-plate clutch 15, the clutch lever 21, the cable securing portion 22, and the clutch cable 23 are contiguous with one another. The clutch cable 23 extends to the left of vehicle passing through the cylindrical portion of the cable guiding member 24. In the rear of the multi-plate clutch 15, the front crank case 5 and a rear crank case 6 are illustrated. In the rear of the centrifugal clutch 11, a cylinder head 26, a cylinder head cover 27, and an ignition plug 28, which are contiguous with the upper portions of the front crank case 5 and of the rear crank case 6, are illustrated.

Figure 3:
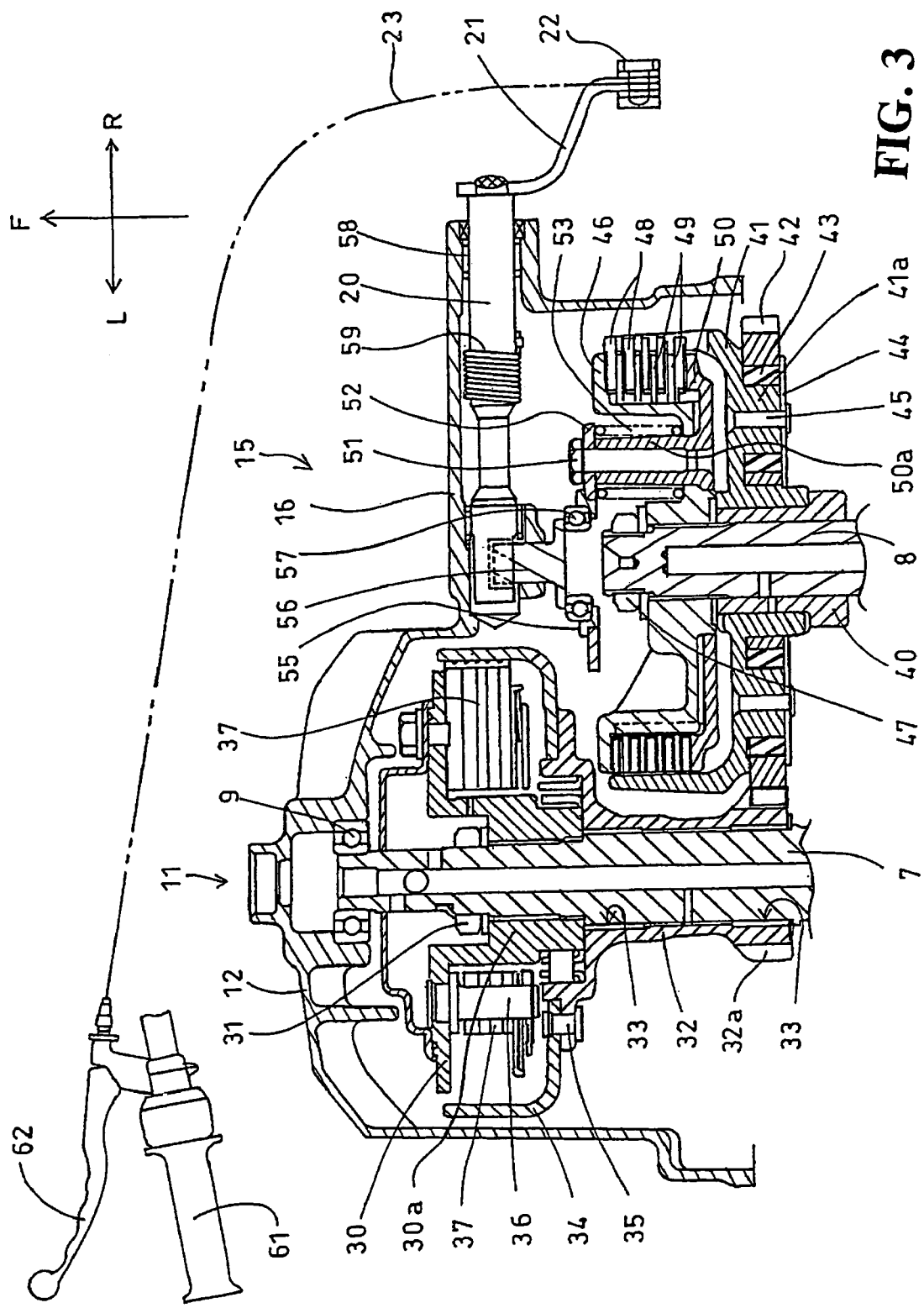
FIG. 3 is a cross sectional development including the center line of a centrifugal clutch 11, the center line of a multi-plate clutch 15, a clutch lever shaft 20, a clutch lever 21, and a cable securing portion 22.

FIG. 3 is a development view of a cross section, seen from the above, which includes the center line of the centrifugal clutch 11, the center line of the multi-plate clutch 15, the clutch lever shaft 20, the clutch lever 21, and the cable securing portion 22. The centrifugal clutch 11 is provided at the anterior end portion of the crankshaft 7. The multi-plate clutch 15 is provided at the anterior end portion of the main shaft 8 of the transmission. The anterior end of the crankshaft 7 is supported by the centrifugal clutch cover 12 through a ball bearing 9.

In the centrifugal clutch 11, a driving disk 30 is spline-fitted to the crankshaft 7 at a boss portion 30a thereof and is axially fixed by a nut 31. Adjacent to the above-described driving disk 30, a boss member 32 provided with an output gear 32a at an end portion is rotatably mounted on the crankshaft 7 through a needle bearing 33. The above-described output gear 32a is an output gear of the centrifugal clutch 11. A clutch drum 34 is fixed to the above-described boss member 32 by a rivet 35. Each of clutch shoes 37 is swingably supported by each of a plurality of pins 36 projecting on the above-described driving disk 30. The clutch shoe 37 is biased by a return spring towards the boss portion 30a of the driving disk 30 when an internal combustion engine is stopped.

In the multi-plate clutch 15, a cylindrical member 40 is fitted onto the main shaft 8 of the transmission so as to be capable of rotationally moving. A clutch outer 41 is supported on the outer circumference of the cylindrical member, so as to be capable of rotationally moving. An input gear 42 of the transmission is mounted on a plurality of rear projecting portions 41a of the clutch outer 41 through a cushioning material 43 by a plate 44 and a rivet 45. This input gear 42 always meshes with the output gear 32a of the centrifugal clutch 11. Adjacent to the above-described cylindrical member 40, a clutch center 46 is spline-fitted to an end portion of the main shaft 8 and is axially fixed by a nut 47.

Provided in the cylindrical portion of the clutch outer 41 are a plurality of driving friction plates 48, engaged therewith movably in an axial direction. Provided in the cylindrical portion of the clutch center 46 are a plurality of driven friction plates 49, engaged therewith movably in an axial direction and alternately disposed in relation to the above-described driving friction plates 48.

A projecting portion 50a of a pressure plate 50A is provided, penetrating a disk portion of the clutch center 46 and projecting to the other side. The pressure plate 50 is placed on the projecting portion adjacently to the clutch center 46 and is slidably in the axial direction. A coil spring 53 is placed between the clutch center 46 and a spring bearing plate 52 is mounted on the protruding portion 50a through a bolt 51. Pressed by a biasing force of the coil spring 53 are pairs of the above-described pluralities of driving friction plates 48 and driven friction plates 49, which are sandwiched between the clutch center 46 and the pressure plate 50. A state in which the above-described friction plates 48 and 49 are pressed is a clutch engaged state, which is a normal state.

A lifter 55 is fitted into the above-described spring bearing plate 52. A lifter pin 56 is fitted, slidably in the axial direction, into a concave portion on the inside of the multi-plate clutch cover 16. A ball bearing 57 is set between the lifter 55 and the lifter pin 56 to prevent the lifter pin 56 from being affected by the rotation of the multi-plate clutch 15.

On the inside of the multi-plate clutch cover 16, the clutch lever shaft 20, which is movable rotationally, is provided orthogonal to the above-described lifter pin 56 through the needle bearing 58. A cam touching to the end portion of the lifter pin 56 is formed at the inner end of the clutch lever shaft 20. The cam moves rotationally according to the rotational movement of the clutch lever shaft 20 to press the lifter pin 56. The clutch lever shaft 20 is set to return to an initial position by a screw coil spring 59.

The outer end of the clutch lever shaft 20 projects out of the multi-plate clutch cover 16, the clutch lever 21 is mounted on the end portion thereof, and the cable securing portion 22 is further provided at the tip end thereof. As shown in FIGS. 1 and 2, the clutch cable 23 is connected with the cable securing portion 22. The tip end of the clutch cable 23 is connected with a clutch operating lever 62, which is mounted adjacently to a grip 61 at the left end of the traveling handlebar of the vehicle.

In the power unit provided with the clutch of the above-described configuration, when the internal combustion engine is started and the rotation of the crankshaft 7 exceeds a predetermined rotation speed, the clutch shoe 37, supported by the driving disk 30 rotating along with the crankshaft 7 in the centrifugal clutch 11, outwardly moves due to the centrifugal force and touches to the clutch drum 34. Thus, the power of the crankshaft 7 is transmitted to the input gear 42, which is provided on the multi-plate clutch 15, through the clutch drum 34, the boss member 32, and the output gear 32a.

In a normal state, the multi-plate clutch 15 is in the engaged state. Therefore, the power transmitted from the centrifugal clutch 11 is transmitted to the main shaft 8 of the transmission through the clutch outer 41, the driving friction plate 48, the driven friction plate 49, and the clutch center 46.

When an operator of the vehicle operates the clutch operating lever 62 and pulls the clutch cable 23 in order to shift gears, the clutch lever 21 and the clutch lever shaft 20 move rotationally, and the lifer pin 56 moves in the axial direction. By the thrust of the lifter pin 56, the pressure plate 50 is pressed, through the ball bearing 57, the lifter 55, and the spring bearing plate 52, against the biasing force of the coil spring 53. Thus, the pressing force onto the above-described friction plates 48 and 49 is eased, causing the multi-plate clutch 15 to be in a disengaged state.

As described above, the following effects are provided according to embodiments of the present embodiment:

the layout of the whole power unit becomes compact because the multi-plate clutch 15 and the clutch lever shaft 20 are disposed adjacent to each other, and because the clutch lever shaft 20 is disposed between the centrifugal clutch 11 and the multi-plate clutch 15 when viewed from the top of the power unit.

(2) the clutch cable does not extend out of the left and right sides of the power unit, nor does it affect the width of vehicle. Therefore, when the power unit is mounted on the vehicle, the layout of the whole vehicle becomes compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A layout structure of a clutch lever shaft of a power unit in which a crankshaft and a transmission main shaft are disposed in parallel with an anteroposterior direction of a vehicle and a starter centrifugal clutch and a transmission manual multi-plate clutch are provided, the layout structure of the clutch lever shaft comprising:

the centrifugal clutch and the manual multi-plate clutch being mounted in front portions of the crankshaft and the transmission main shaft, respectively, said manual multi-plate clutch includes friction plates movable in an axial direction;

the clutch lever shaft of the manual multi-plate clutch, in a vicinity of an end portion of a lifter pin of the clutch, being mounted orthogonally and substantially vertically upwardly in relation to a direction in which the friction plates are pressed; and the clutch lever shaft is disposed between the centrifugal clutch and the manual multi-plate clutch when viewed from a front of the power unit.

2. The layout structure of the clutch lever shaft according to claim 1, and further including a clutch cable, an end of said clutch cable being connected with the clutch lever shaft of the transmission manual multi-plate clutch and the other end of which is connected with a clutch operating lever provided on a handlebar of a vehicle, said clutch cable being disposed over a clutch cover covering both clutches.

3. The layout structure of the clutch lever shaft according to claim 1, and further including a clutch lever operatively connected to said clutch lever shaft and projecting orthogonally therefrom for selectively imparting rotation to said clutch lever.

4. The layout structure of the clutch lever shaft according to claim 1, wherein selectively imparting rotation to said clutch lever shaft imparts movement to said lifter pin for selectively disengaging said manual multi-plate clutch from rotating together with said starter centrifugal clutch.

5. The layout structure of the clutch lever shaft according to claim 1, wherein during a normal state the starter centrifugal clutch rotates together with the crankshaft for imparting rotation to the transmission shaft, and during actuation of the clutch lever shaft, the transmission shaft is disengaged from rotating together with the crankshaft.

6. The layout structure of the clutch lever shaft according to claim 1, and further including a multi-plate clutch cover wherein said clutch lever shaft is rotatably mounted on an interior portion of said multi-plate clutch cover.

7. The layout structure of the clutch lever shaft according to claim 1, and further including a bearing operatively positioned relative to said lifter pin for preventing the lifter pin from being rotated by said manual multi-plate clutch.

8. The layout structure of the clutch lever shaft according to claim 1, and further including a spring member operatively connected to said clutch lever shaft for returning said clutch lever shaft to a normal position after actuation.

9. The layout structure of the clutch lever shaft according to claim 1, wherein said starter centrifugal clutch is disposed on a first plane and said transmission manual multi-plate clutch is disposed on a second plane positioned at a distinct elevation relative to said first plate with said clutch lever shaft being disposed between said first and second planes.

10. The layout structure of the clutch lever shaft according to claim 1, wherein said clutch lever shaft includes a cam portion for engaging said lifter pin for selectively actuating said lifter pin.

11. A layout structure comprising:

a power unit having a crankshaft and a transmission main shaft disposed in parallel relative to each other, said crankshaft and said transmission main shaft having a front portion and a rear portion;

a starter centrifugal clutch operatively connected to said crankshaft;

a transmission manual multi-plate clutch operatively connected to said transmission main shaft, said transmission manual multi-plate clutch includes friction plates movable in an axial direction; and a clutch lever shaft operatively disposed for selectively actuating said transmission manual multi-plate clutch;

said starter centrifugal clutch and said transmission manual multi-plate clutch being mounted in the front portions of the crankshaft and the transmission main shaft, respectively;

said clutch lever shaft of the transmission manual multi-plate clutch being disposed for selectively actuating an end portion of a lifter pin of the transmission manual multi-plate clutch, said clutch lever shaft being mounted orthogonally and substantially vertically upwardly in relation to a direction in which a friction plate is pressed; and said clutch lever shaft being positioned directly adjacent to the starter centrifugal clutch and the manual multi-plate clutch.

12. The layout structure of the clutch lever shaft according to claim 11, and further including a clutch cable, an end of said clutch cable being connected with the clutch lever shaft of the transmission manual multi-plate clutch and the other end of which is connected with a clutch operating lever provided on a handlebar of a vehicle, said clutch cable being disposed over a clutch cover covering both clutches.

13. The layout structure of the clutch lever shaft according to claim 11, and further including a clutch lever operatively connected to said clutch lever shaft and projecting orthogonally therefrom for selectively imparting rotation to said clutch lever.

14. The layout structure of the clutch lever shaft according to claim 11, wherein selectively imparting rotation to said clutch lever shaft imparts movement to said lifter pin for selectively disengaging said manual multi-plate clutch from rotating together with said starter centrifugal clutch.

15. The layout structure of the clutch lever shaft according to claim 11, wherein during a normal state the starter centrifugal clutch rotates together with the crankshaft for imparting rotation to the transmission shaft, and during actuation of the clutch lever shaft, the transmission shaft is disengaged from rotating together with the crankshaft.

16. The layout structure of the clutch lever shaft according to claim 11, and further including a multi-plate clutch cover wherein said clutch lever shaft is rotatably mounted on an interior portion of said multi-plate clutch cover.

17. The layout structure of the clutch lever shaft according to claim 11, and further including a bearing operatively positioned relative to said lifter pin for preventing the lifter pin from being rotated by said manual multi-plate clutch.

18. The layout structure of the clutch lever shaft according to claim 11, and further including a spring member operatively connected to said clutch lever shaft for returning said clutch lever shaft to a normal position after actuation.

19. The layout structure of the clutch lever shaft according to claim 11, wherein said starter centrifugal clutch is disposed on a first plane and said transmission manual multi-plate clutch is disposed on a second plane positioned at a distinct elevation relative to said first plate with said clutch lever shaft being disposed between said first and second planes.

20. The layout structure of the clutch lever shaft according to claim 11, wherein said clutch lever shaft includes a cam portion for engaging said lifter pin for selectively actuating said lifter pin.

* * * * *